United States Patent
Kitagawa et al.

(10) Patent No.: US 12,529,731 B2
(45) Date of Patent: Jan. 20, 2026

(54) BATTERY MEASUREMENT APPARATUS AND BATTERY STATE MEASUREMENT METHOD

(71) Applicant: DENSO CORPORATION, Kariya (JP)

(72) Inventors: Masaaki Kitagawa, Kariya (JP); Isao Ishibe, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 18/528,868

(22) Filed: Dec. 5, 2023

(65) Prior Publication Data

US 2024/0168100 A1 May 23, 2024

Related U.S. Application Data

(63) Continuation of application No. PCT/JP2022/019897, filed on May 11, 2022.

(30) Foreign Application Priority Data

Jun. 10, 2021 (JP) .................. 2021-097229

(51) Int. Cl.
*G01R 31/389* (2019.01)
*G01R 31/36* (2020.01)
*G01R 31/374* (2019.01)
*G01R 31/3842* (2019.01)

(52) U.S. Cl.
CPC ....... *G01R 31/389* (2019.01); *G01R 31/3648* (2013.01); *G01R 31/374* (2019.01); *G01R 31/3842* (2019.01)

(58) Field of Classification Search
None
See application file for complete search history.

(56) References Cited

U.S. PATENT DOCUMENTS 7,148,708 B1* 12/2006 Potempa .............. G01R 31/389
324/724
2016/0195577 A1 7/2016 Osaka et al.
2021/0028637 A1 1/2021 Kitagawa et al.
2022/0373602 A1 11/2022 Kitagawa et al.

FOREIGN PATENT DOCUMENTS

JP 2018-041581 A 3/2018
JP 2018-190502 A 11/2018

* cited by examiner

*Primary Examiner* — Jas A Sanghera
(74) *Attorney, Agent, or Firm* — Oliff PLC

(57) ABSTRACT

In a battery measurement apparatus, a storage battery is caused to supply an alternating-current signal or receive an alternating-current signal to the storage battery. The alternating-current signal flowing through a first electrical path via a second electrical path is measured. In response to the alternating-current signal, a response signal of the storage battery received. Information related to a complex impedance of the storage battery is calculated based on the alternating-current signal and the response signal. A magnetic flux passage area is defined as an area surrounded by the second electrical path and through which a magnetic flux based on the alternating-current signal flowing through the first electrical path passes. A size of the magnetic flux passage area is set such that an error in the complex impedance due to induced electromotive force based on the alternating-current signal flowing through the first electrical path is within a range of ±1 mΩ.

16 Claims, 12 Drawing Sheets

BATTERY MEASUREMENT APPARATUS AND BATTERY STATE MEASUREMENT METHOD

CROSS-REFERENCE TO RELATED APPLICATION

The present application is a continuation application of International Application No. PCT/JP2022/019897, filed on May 11, 2022, which claims priority to Japanese Patent Application No. 2021-097229, filed on Jun. 10, 2021. The contents of these applications are incorporated herein by reference in their entirety.

BACKGROUND

Technical Field

The present disclosure relates to a battery measurement apparatus and a battery state measurement method.

Related Art

Conventionally, measurement of a complex impedance of a storage battery has been performed to measure a state of the storage battery. In the measurement, an alternating-current signal is applied to a storage battery, and a response signal thereof is measured. Then, a complex impedance characteristic is calculated based on the alternating-current signal and the response signal. Thus, a degradation state of the storage battery and the like is determined based on the complex impedance characteristic.

SUMMARY

One aspect of the present disclosure provides a battery measurement apparatus that measures a state of a storage battery. The battery measurement apparatus includes a signal control unit, an alternating-current signal measuring unit, a response signal input unit, and a calculating unit. The signal control unit is provided on a first electrical path connecting a positive electrode and a negative electrode of the storage battery, and causes the storage battery to supply a predetermined alternating-current signal or receive a predetermined alternating-current signal to the storage battery. The alternating-current signal measuring unit is provided on a second electrical path differing from the first electrical path and measures the alternating-current signal flowing through the first electrical path via the second electrical path. The response signal input unit receives a response signal of the storage battery that is in response to the alternating-current signal. The calculating unit calculates information related to a complex impedance of the storage battery based on the alternating-current signal and the response signal. A magnetic flux passage area is defined as an area surrounded by the second electrical path and through which a magnetic flux based on the alternating-current signal flowing through the first electrical path passes. A size of the magnetic flux passage area is set such that an error in the complex impedance due to induced electromotive force generated in the second electrical path based on the alternating-current signal flowing through the first electrical path is within a range of ±1 mΩ.

DESCRIPTION OF THE EMBODIMENTS

Figure 1:
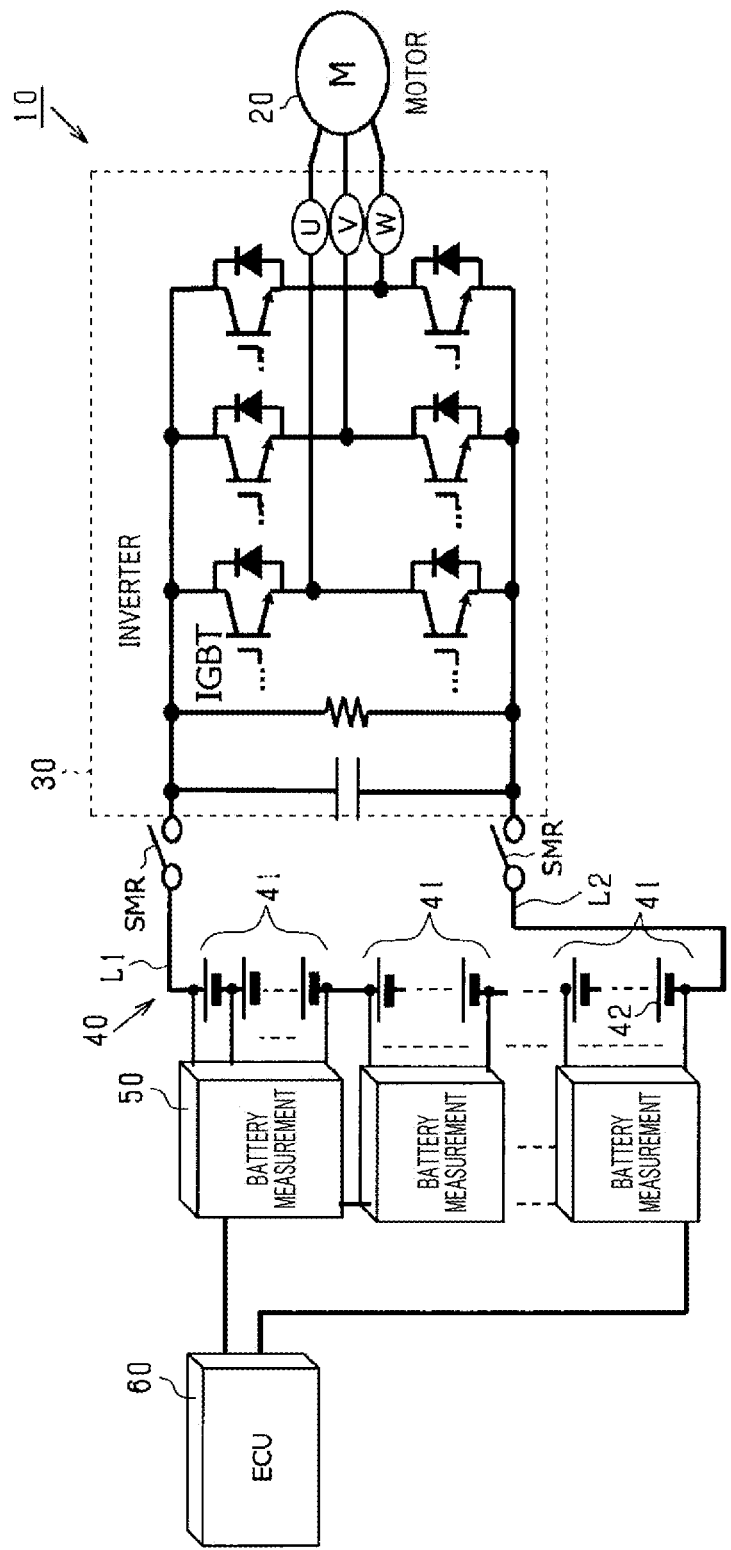
FIG. 1 is an overall configuration diagram illustrating a power supply system.

Conventionally, measurement of a complex impedance of a storage battery has been performed to measure a state of the storage battery (such as JP 6226261 B2). In a disclosure described in JP 6226261 B2, a power controller applies an alternating-current signal, such as a rectangular-wave signal, to a storage battery, measures a response signal thereof, and calculates a complex impedance characteristic based on the alternating-current signal and the response signal. Then, a degradation state of the storage battery and the like are determined based on the complex impedance characteristic.

In addition, in JP 2018-190502 A, an oscillator supplies an alternating-current signal, such as a sine-wave current, to a storage battery, and a lock-in amplifier detects a response signal (voltage variation) thereof. The complex impedance characteristic is calculated based on the alternating-current signal and the response signal. Then, the degradation state of the storage battery and the like are determined based on the complex impedance characteristic.

Here, storage batteries used in electric cars and the like tend to have increasingly larger capacities. In a case of a large-capacity storage battery, a problem arises in that the complex impedance decreases and the storage battery becomes susceptible to outside influences. For example, when the alternating-current signal is supplied to the storage battery, induced electromotive force may be generated in an electrical path for measuring the alternating-current signal due to changes in a magnetic flux caused by the alternating-current signal. Consequently, a problem occurs in that a measurement error occurs in the alternating-current signal that is measured, and a measurement error also occurs in the complex impedance that is calculated using the alternating-current signal.

It is thus desired to provide a battery measurement apparatus and a battery state measurement method capable of improving measurement accuracy of complex impedance.

A first exemplary embodiment of the present disclosure provides a battery measurement apparatus that measures a state of a storage battery, the battery measurement apparatus including: a signal control unit that is provided on a first electrical path connecting a positive electrode and a negative electrode of the storage battery, and causes the storage battery to supply a predetermined alternating-current signal or receive a predetermined alternating-current signal to the storage battery; an alternating-current signal measuring unit that is provided on a second electrical path differing from the first electrical path and measures the alternating-current signal flowing through the first electrical path via the second electrical path; a response signal input unit that receives a response signal of the storage battery that is in response to the alternating-current signal; and a calculating unit that calculates information related to a complex impedance of the storage battery based on the alternating-current signal and the response signal. A magnetic flux passage area is defined as an area surrounded by the second electrical path and through which a magnetic flux based on the alternating-current signal flowing through the first electrical path passes. A size of the magnetic flux passage area is set such that an error in the complex impedance due to induced electromotive force generated in the second electrical path based on the alternating-current signal flowing through the first electrical path is within a range of ±1 mΩ.

When the alternating-current signal flowing through the first electrical path is measured via the second electrical path that differs from the first electrical path, induced electromotive force is generated in the second electrical path based on the alternating-current signal flowing through the first electrical path. A measurement error occurs in the alternating-current signal, and consequently, an error in the calculated complex impedance occurs.

Here, it has been found that the magnitude of the induced electromotive force generated in the second electrical path can be changed by the size of the magnetic flux passage area surrounded by the second electrical path. Therefore, in the present disclosure, the size of the magnetic flux passage area is set such that the error in the complex impedance due to induced electromotive force generated in the second electrical path based on the alternating-current signal flowing through the first electrical path is within a range of ±1 mΩ. As a result, the error in the complex impedance based on the induced electromotive force can be suppressed.

A second exemplary embodiment of the present disclosure provides a battery measurement apparatus that measures a state of a storage battery, the battery measurement apparatus including: a signal control unit that is provided on a first electrical path connecting a positive electrode and a negative electrode of the storage battery, and causes the storage battery to supply a predetermined alternating-current signal or receive a predetermined alternating-current signal to the storage battery; an alternating-current signal measuring unit that is provided on a second electrical path differing from the first electrical path and measures the alternating-current signal flowing through the first electrical path via the second electrical path; a response signal input unit that receives a response signal of the storage battery that is in response to the alternating-current signal; and a calculating unit that calculates information related to a complex impedance of the storage battery based on the alternating-current signal and the response signal. A magnetic flux passage area is defined as an area surrounded by the second electrical path and through which a magnetic flux based on the alternating-current signal flowing through the first electrical path passes. A size of the magnetic flux passage area is set such that induced electromotive force generated in the second electrical path based on the alternating-current flowing through the first electrical path is within an electromotive force allowable-value range including zero.

When the alternating-current signal flowing through the first electrical path is measured via the second electrical path that differs from the first electrical path, induced electromotive force is generated in the second electrical path based on the alternating-current signal flowing through the first electrical path. A measurement error occurs in the alternating-current signal, and consequently, an error in the calculated complex impedance occurs.

Here, it has been found that the magnitude of the induced electromotive force generated in the second electrical path can be changed by the size of the magnetic flux passage area surrounded by the second electrical path. Therefore, in the present disclosure, the size of the magnetic flux passage area is set such that the induced electromotive force is within an electromotive force allowable-value range including zero. As a result, the error in the complex impedance based on the induced electromotive force can be suppressed.

A third exemplary embodiment of the present disclosure provides a battery measurement apparatus that measures a state of a storage battery, the battery measurement apparatus including: a signal control unit that is provided on a first electrical path connecting a positive electrode and a negative electrode of the storage battery, and causes the storage battery to supply a predetermined alternating-current signal or receive a predetermined alternating-current signal to the storage battery; an alternating-current signal measuring unit that is provided on a second electrical path differing from the first electrical path and measures the alternating-current signal flowing through the first electrical path via the second electrical path; a response signal input unit that receives a response signal of the storage battery that is in response to the alternating-current signal; and a calculating unit that calculates information related to a complex impedance of the storage battery based on the alternating-current signal and the response signal. The alternating-current signal measuring unit measures the alternating-current signal using a resistor that is provided on the first electrical path. The battery measurement apparatus includes a correcting unit that corrects the complex impedance calculated by the calculating unit using ωr×MI/Rs, where a frequency of the alternating-current signal is ωr, mutual inductance between the first electrical path and the second electrical path is MI, and a resistance value of the resistor is Rs.

When the alternating-current signal flowing through the first electrical path is measured via the second electrical path that differs from the first electrical path, induced electromotive force is generated in the second electrical path based on the alternating-current signal flowing through the first electrical path. A measurement error occurs in the alternating-current signal, and consequently, an error in the calculated complex impedance occurs.

Here, when the frequency of the alternating-current signal is ωr, the mutual inductance between the first electrical path and the second electrical path is MI, and the resistance value of the resistor is Rs, the error in the complex impedance due to the induced electromotive force generated in the second electrical path based on the alternating-current signal flowing through the first electrical path is expressed using ωr×MI/Rs, and the error in the complex impedance can be corrected by ωr×MI/Rs. The frequency or of the alternating-current signal can be measured during measurement of the alternating-current signal. The resistance value of the resistor is a preset value. In addition, the mutual inductance can be calculated by a simulation using the size of the magnetic flux passage area and the like. Therefore, ωr×MI/Rs can be calculated using these values. As a result of the complex impedance being corrected using ωr×MI/Rs, the error in the complex impedance can be suppressed.

A fourth exemplary embodiment of the present disclosure provides a battery state measurement method performed by a battery measurement apparatus that measures a state of a storage battery, the battery state measurement method including: a signal control step of causing the storage battery to supply a predetermined alternating-current signal or receive a predetermined alternating-current signal to the storage battery through a first electrical path connecting a positive electrode and a negative electrode of the storage battery; an alternating-current signal measuring step of measuring the alternating-current signal flowing through the first electrical path via the second electrical path that differs from the first electrical path; a response signal input step of receiving a response signal of the storage battery that is in response to the alternating-current signal; and a calculating step of calculating information related to a complex impedance of the storage battery based on the alternating-current signal and the response signal. At the alternating-current signal measuring step, the alternating-current signal is measured using a resistor that is provided on the first electrical path. The battery state measurement method includes a correcting step of correcting the complex impedance calculated at the calculating step using ωr×MI/Rs, where a frequency of the alternating-current signal is ωr, mutual inductance between the first electrical path and the second electrical path is MI, and a resistance value of the resistor is Rs.

According to the fourth exemplary embodiment as well, effects similar to those according to the exemplary embodiment can be achieved.

The present disclosure will be further clarified through the detailed description below, with reference to the accompanying drawings.

First Embodiment

A first embodiment in which a battery measurement apparatus is applied to a power supply system of a vehicle (such as a hybrid car or an electrical car) will hereinafter be described with reference to the drawings.

As shown in FIG. 1, a power supply system 10 includes a motor 20 that serves as a rotating electric machine, an inverter 30 that serves as a power converter that supplies a three-phase current to the motor 20, an assembled battery 40 that is capable of being charged and discharged, a battery measurement apparatus 50 that measures a state of the assembled battery 40, and an electronic control unit (ECU) 60 that controls the motor 20 and the like.

The motor 20 is an onboard main machine and is capable of transferring power to and from a drive wheel (not shown). According to the present embodiment, a three-phase permanent-magnet synchronous motor is used as the motor 20.

The inverter 30 is configured by a full-bridge circuit having the same numbers of upper and lower arms as the number of phase windings. An energization current is adjusted in each phase winding by on/off states of a switch (semiconductor switching element) that is provided in each arm.

The inverter 30 is provided with an inverter control apparatus (not shown). The inverter control apparatus performs energization control by on/off states of the switches in the inverter 30 based on various types of detection information, and requests for power-running drive and power generation of the motor 20. As a result, the inverter control apparatus supplies electric power from the assembled battery 40 to the motor 20 through the inverter 30, and drives the motor 20 by power-running drive. In addition, the inverter control apparatus causes the motor 20 to generate electric power based on power from the drive wheel. The generated power is converted and supplied to the assembled battery 40 through the inverter 30, and the assembled battery 40 is thereby charged. According to the present embodiment, each switch in the inverter 30 is an insulated-gate bipolar transistor (IGBT).

The assembled battery 40 is electrically connected to the motor 20 with the inverter 30 therebetween. The assembled battery 40 has an inter-terminal voltage that may be, for example, equal to or greater than 100 V. The assembled battery 40 is configured by a plurality of battery modules 41 being connected in series. The battery module 41 is configured by a plurality of battery cells 42 being connected in series. For example, as the battery cell 42, a lithium-ion storage battery or a nickel-hydrogen storage battery may be used.

A positive-electrode-side terminal of an electrical load such as the inverter 30 is connected to a positive-electrode-side power supply path L1 that is connected to a positive-electrode-side power supply terminal of the assembled battery 40. In a similar manner, a negative-electrode-side terminal of the electrical load such as the inverter 30 is connected to a negative-electrode-side power supply path L2 that is connected to a negative-electrode-side power supply terminal of the assembled battery 40. Here, the positive-electrode-side power supply path L1 and the negative-electrode-side power supply path L2 are each provided with a relay switch SMR (system main relay switch) and configured to be capable of switching between energization and interruption of energization by the relay switch SMR.

The battery measurement apparatus 50 is an apparatus that measures a storage state (state-of-charge [SOC]), a degradation state (state-of-health [SOH]), and the like of each battery cell 42. The battery measurement apparatus 50 according to the first embodiment is provided for each battery module 41. The battery measurement apparatus 50 is connected to the ECU 60 and supplies the state of each battery cell 42 and the like. A configuration of the battery measurement apparatus 50 will be described hereafter.

The ECU 60 issues requests for power-running drive and power generation to the inverter control apparatus based on various types of information. The various types of information may include, for example, operation information on an accelerator and a brake, a vehicle speed, a state of the assembled battery 40, and the like.

Figure 2:
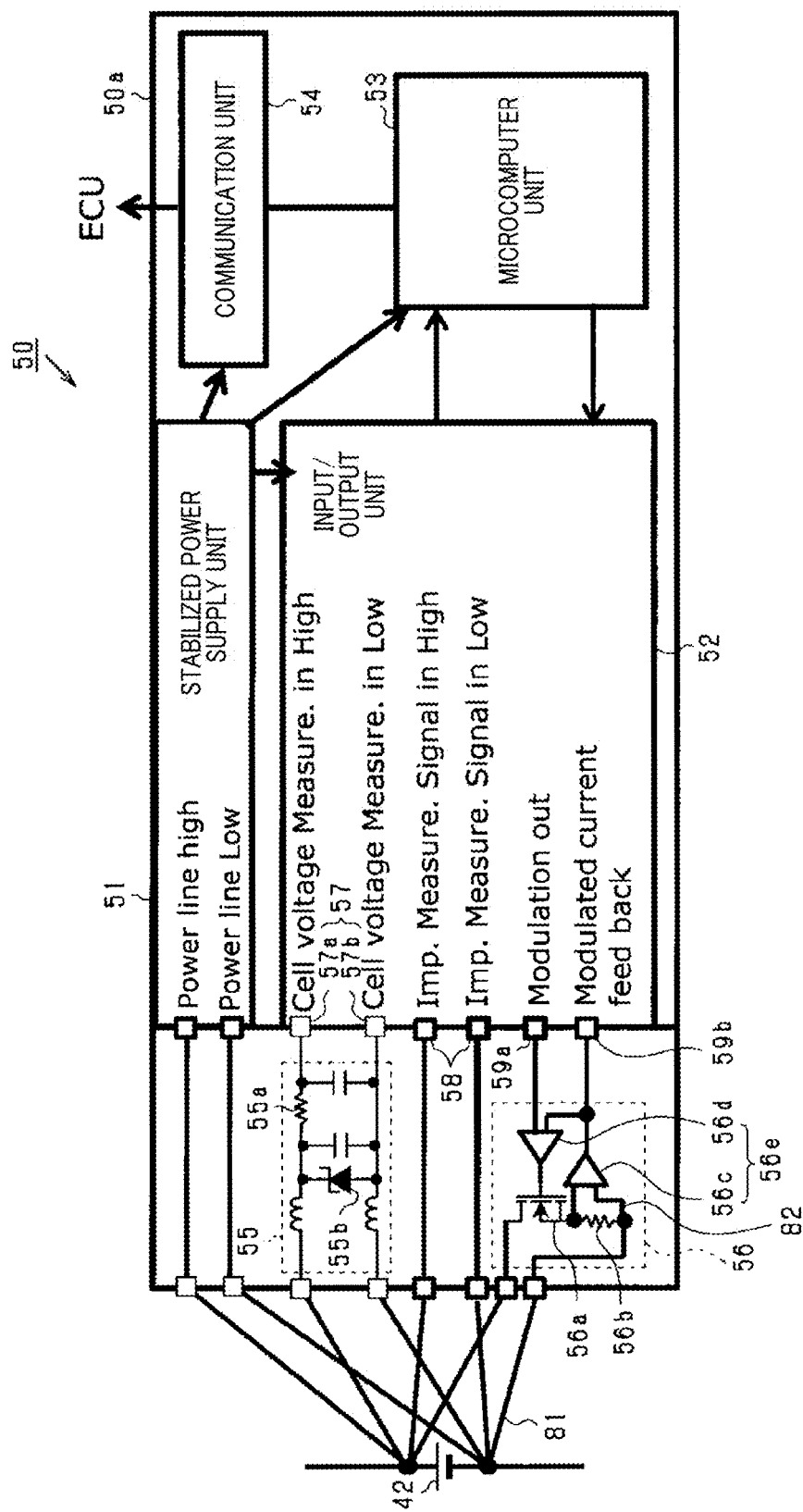
FIG. 2 is a configuration diagram illustrating a battery measurement apparatus according to a first embodiment.

Next, the battery measurement apparatus 50 will be described in detail. As shown in FIG. 2, the battery measurement apparatus 50 is provided for each battery module according to the first embodiment.

The battery measurement apparatus 50 includes an application-specific integrated circuit (ASIC) unit 50a, a filter unit 55, and a current modulation circuit 56. The ASIC unit 50a includes a stabilized power supply supplying unit 51, an input/output unit 52, a microcomputer unit 53 that serves as a calculating unit, and a communication unit 54.

The stabilized power supply supplying unit 51 is connected to a power supply line of the battery cell 42 and supplies electric power supplied from the battery cell 42 to the input/output unit 52, the microcomputer unit 53, and the communication unit 54. The input/output unit 52, the microcomputer unit 53, and the communication unit 54 are driven based on this electric power.

The input/output unit 52 is connected to the battery cell 42 to be measured. Specifically, the input/output unit 52 has a direct-current voltage input terminal 57 to which a direct-current voltage can be received (measured) from the battery cell 42. The filter unit 55 is provided between the battery cell 42 and the direct-current voltage input terminal 57. That is, a resistor-capacitor (RC) filter 55a that serves as a filter circuit, a Zener diode 55b that serves as a protective element, and the like are provided between a positive-electrode-side terminal 57a and a negative-electrode-side terminal 57b of the direct-current voltage input terminal 57. In other words, the RC filter 55a, the Zener diode 55b, and the like are connected to the battery cell 42 in parallel.

In addition, the input/output unit 52 has a response signal input terminal 58 for receiving a response signal (voltage variation) between the terminals of the battery cell 42. The response signal reflects internal complex impedance information of the battery cell 42 Therefore, the input/output unit 52 functions as a response signal input unit.

Furthermore, the input/output unit 52 has an instruction signal output terminal 59a that is connected to the current modulation circuit 56 and supplies an instruction signal to the current modulation circuit 56. The instruction signal designates a sine-wave signal (alternating-current signal) to be supplied from the battery cell 42. In addition, the input/output unit 52 has a feedback signal input terminal 59b. The feedback signal input terminal 59b receives, through the current modulation circuit 56, a current signal (alternating-current signal) that actually flows from the battery cell 42 as a feedback signal.

Furthermore, the input/output unit 52 is connected to the microcomputer unit 53 and is configured to supply, to the microcomputer unit 53, the direct-current voltage received from the direct-current voltage input terminal 57, the response signal received from the response signal input terminal 58, the feedback signal received from the feedback signal input terminal 59b, and the like. Here, the input/output unit 52 is provided with an analog-to-digital converter therein, and is configured to convert received analog signals to digital signals and supply the digital signals to the microcomputer unit 53.

In addition, the input/output unit 52 is configured to receive an instruction signal from the microcomputer unit 53 and supply the instruction signal to the current modulation circuit 56 from the instruction signal output terminal 59a. Here, the input/output unit 52 is provided with a digital-to-analog (DA) converter therein, and is configured to convert digital signals received from the microcomputer unit 53 to analog signals and supply the instruction signals to the current modulation circuit 56. Furthermore, direct-current bias is applied to the sine-wave signal that is designated to the current modulation circuit 56 by the instruction signal, and the sine-wave signal is kept from becoming a negative current (a reverse current in relation to the battery cell 42).

The current modulation circuit 56 is a circuit that supplies a predetermined sine-wave signal with the battery cell 42 to be measured as a power supply. Specifically, the current modulation circuit 56 includes a semiconductor switch element 56a (such as a metal-oxide field-effect transistor [MOSFET]) that serves as a switch unit and a resistor 56b (shunt resistor) that serves as a resistor that is connected in series to the semiconductor switch element 56a. A drain terminal of the semiconductor switch element 56a is connected to a positive electrode of the battery cell 42. A source terminal of the semiconductor switch element 56a is connected in series to one end of the resistor 56b. In addition, another end of the resistor 56b is connected to a negative electrode of the battery cell 42. The semiconductor switch element 56a is configured to be capable of adjusting an amount of energization between the drain terminal and the source terminal.

In addition, the current modulation circuit 56 is provided with a current detection amplifier 56c that is connected to both ends of the resistor 56b. The current detection amplifier 56c that serves as an alternating-current signal measuring unit is configured to measure a current signal that flows to the resistor 56b, and supply the current signal as a feedback signal to the feedback signal input terminal 59b of the input/output unit 52.

Furthermore, the current modulation circuit 56 is provided with a feedback circuit 56d. The feedback circuit 56d that serves as a signal control unit is configured to receive the instruction signal from the instruction signal output terminal 59a of the input/output unit 52 and receive the feedback signal from the current detection amplifier 56c. In addition, the feedback circuit 56d is configured to compare the instruction signal and the feedback signal, and supply the comparison result to a gate terminal of the semiconductor switch element 56a. Hereafter, the current detection amplifier 56c (current sense amplifier) and the feedback circuit 56d of the current modulation circuit 56 are referred to as a measurement control unit 56e.

The semiconductor switch element 56a adjusts an amount of current between the drain and the source by adjusting a voltage that is applied between the gate and the source based on the signal from the feedback circuit 56d, so that the sine-wave signal designated by the instruction signal is supplied from the battery cell 42. Here, when an error occurs between a waveform that is designated by the instruction signal and a waveform that actually flows to the resistor 56b, the semiconductor switch element 56a adjusts the amount of current so that the error is corrected based on the signal from the feedback circuit 56d. As a result, the sine-wave signal that flows to the resistor 56b is stabilized.

The microcomputer unit 53 calculates information related to a complex impedance of the battery cell 42 based on the response signal and the current signal. That is, the microcomputer unit 53 calculates a real part of the complex impedance and an imaginary part of the complex impedance based on the response signal and the current signal. The microcomputer unit 53 supplies the calculation results to the ECU 60 through the communication unit 54.

This complex impedance calculation process is repeatedly performed until the complex impedance is calculated for a plurality of frequencies within a measurement range. For example, the ECU 60 may generate a complex impedance planar plot (Cole-Cole plot) based on the calculation results, and detect characteristics of electrodes, an electrolyte, and the like. For example, the ECU 60 may detect the storage state (SOC) and the degradation state (SOH).

Here, the Cole-Cole plot is not necessarily required to be generated in its entirety and focus may be placed on a portion thereof instead. For example, during traveling, the complex impedance at a certain frequency may be measured at a fixed time interval, and changes in the SOC, the SOH, battery temperature, and the like during traveling may be detected based on changes over time in the complex impedance at the certain frequency. Alternatively, the complex impedance at a certain frequency may be measured at a time interval such as every day, every week, or every year, and changes in the SOH and the like may be detected based on the changes over time in the complex impedance at that certain frequency.

Here, when the current modulation circuit 56 causes the battery cell 42 to supply the alternating-current signal (sine-wave signal) through the first electrical path 81, induced electromotive force based on the alternating-current signal is generated in the second electrical path 82. Here, the first electrical path 81 is an electrical path that connects a series connection body composed of the semiconductor switch element 56a and the resistor 56b of the current modulation circuit 56, and the battery cell 42. The first electrical path 81 connects the positive electrode and the negative electrode of the battery cell 42 with the series connection body therebetween. In addition, the second electrical path 82 is an electrical path that connects the resistor 56b and the current detection amplifier 56c, and differs (is independent) from the first electrical path 81. The current detection amplifier 56c measures a current signal that flows through the first electrical path 81 via the second electrical path 82.

When the induced electromotive force based on the alternating-current signal is generated in the second electrical path 82, a measurement error occurs in the current signal (feedback signal) that is measured. Therefore, the battery measurement apparatus 50 is configured to reduce the induced electromotive force.

Figure 3:
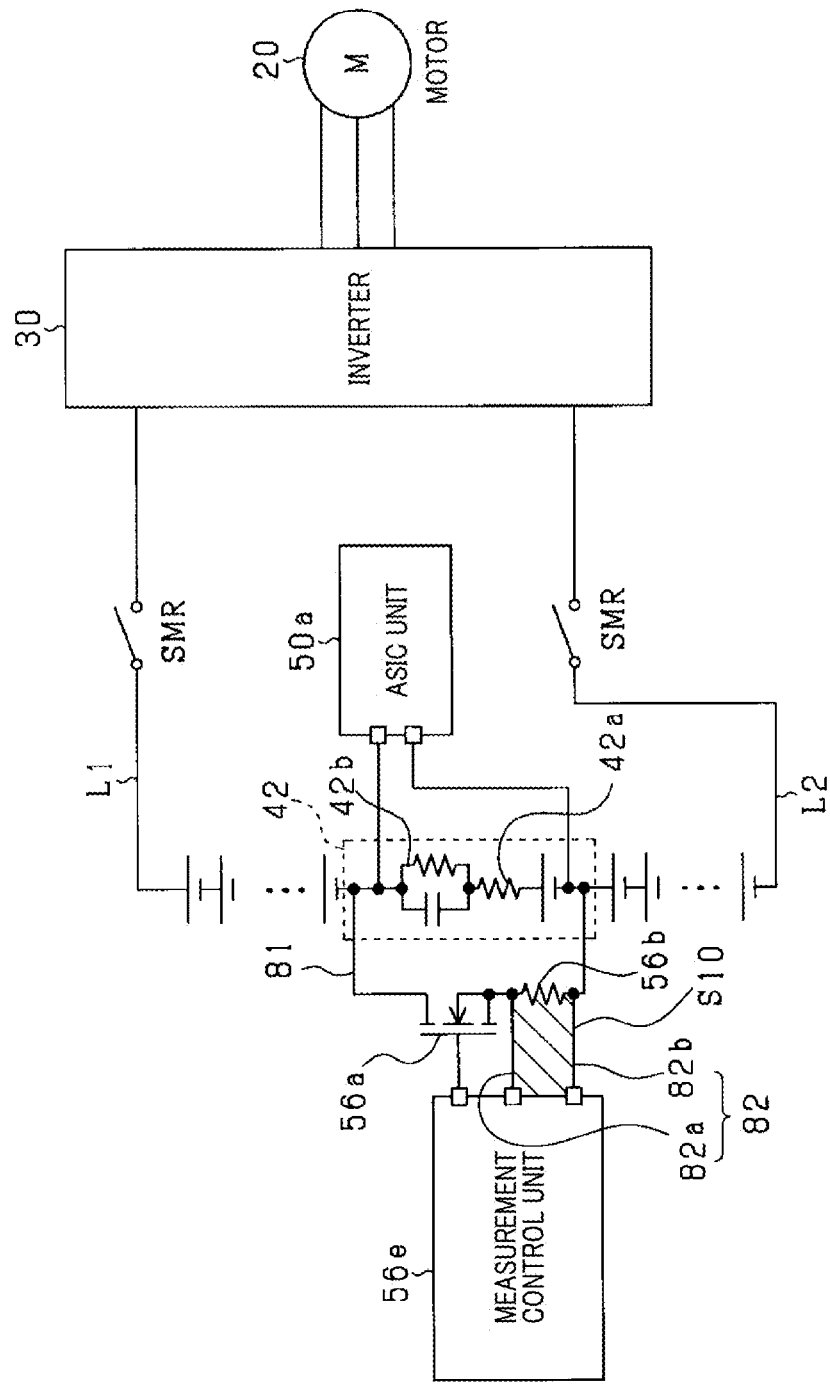
FIG. 3 is a configuration diagram illustrating a connection state of a first electrical path and a second electrical path according to the first embodiment.

Here, before describing the configuration for reducing the induced electromotive force, a principle by which the induced electromotive force is generated and a principle by which the induced electromotive force is suppressed will be described. FIG. 3 is a diagram of the first electrical path 81, the second electrical path 82, and an equivalent circuit model of an internal complex impedance of the battery cell 42. In the equivalent circuit model, the internal complex impedance of the battery cell 42 is composed of a series connection body composed of ohmic resistance 42a and reactive resistance 42b. The ohmic resistance 42a is energization resistance in the electrodes and the electrolyte configuring the battery cell 42. In addition, the reactive resistance 42b expresses resistance caused by an electrode interface reaction in the electrodes and is expressed as a parallel connection body composed of a resistance component and a capacity component.

Expression (1) shows Faraday's Law. Here, E(x, t) denotes a field vector. L denotes a path of a line integral. B(x, t) denotes a magnetic flux density vector. S denotes an area that is closed by a section surrounded by a path of a line integral on a left side. n denotes a normal vector of a point on S. x is a vector that indicates a position from a current element, and t denotes time. That is, the field vector E(x, t) and the magnetic flux density vector B(x, t) are values that are dependent on location and time. Vi(t) denotes the induced electromotive force.

According to the first embodiment, E(x, t) denotes the field vector of the second electrical path 82 and L denotes the path of the second electrical path 82. B(x, t) denotes the magnetic flux density vector by which a magnetic flux based on the alternating-current signal that flows through the first electrical path 81 passes via a magnetic flux passage area S10 that is an area surrounded by the second electrical path 82, the resistor 56b, and the measurement control unit 56e (current detection amplifier 56c). S denotes a surface of the magnetic flux passage area S10. x is a vector that indicates a position from a current element set on the first electrical path 81. Vi(t) denotes the induced electromotive force generated in the second electrical path 82.

$$Vi(t) \equiv \oint_L E(x, t) \cdot dL = -\int_S \frac{\partial}{\partial t} B(x, t) \cdot n dS \quad (1)$$

Based on Faraday's Law, it is found that, if the magnetic flux passage area S10 surrounded by the second electrical path 82 and the like is reduced, the induced electromotive force can be reduced. Therefore, a configuration to minimize the size of the magnetic flux passage area S10 is as follows.

Figure 4:
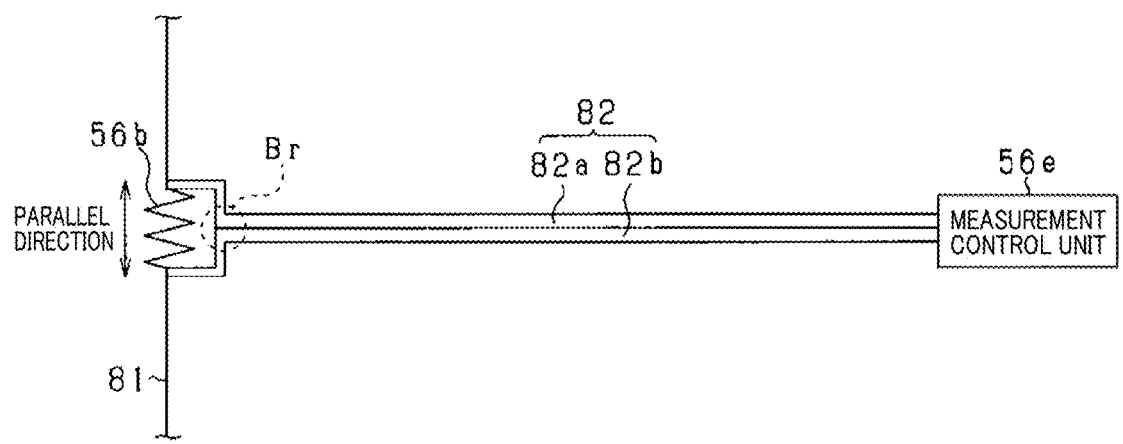
FIG. 4 is a configuration diagram illustrating a connection mode between the battery measurement apparatus and a battery cell according to the first embodiment.
Figure 5A:
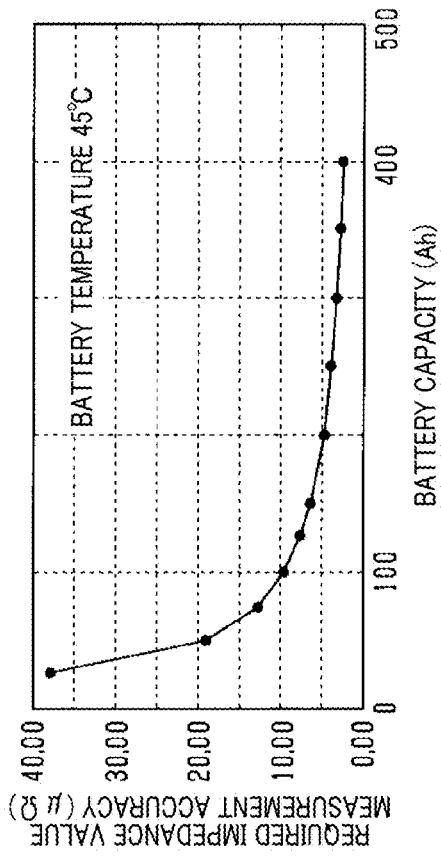
FIGS. 5A to 5D are explanatory diagrams illustrating a relationship between impedance measurement accuracy and battery capacity.
Figure 5B:
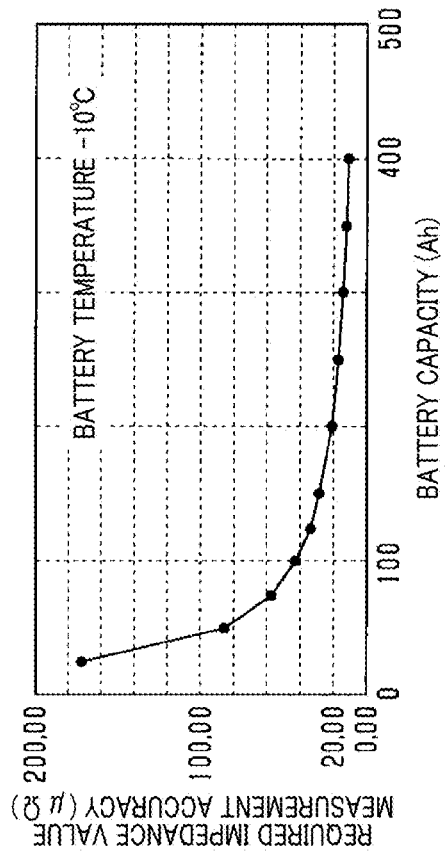
Figure 5C:
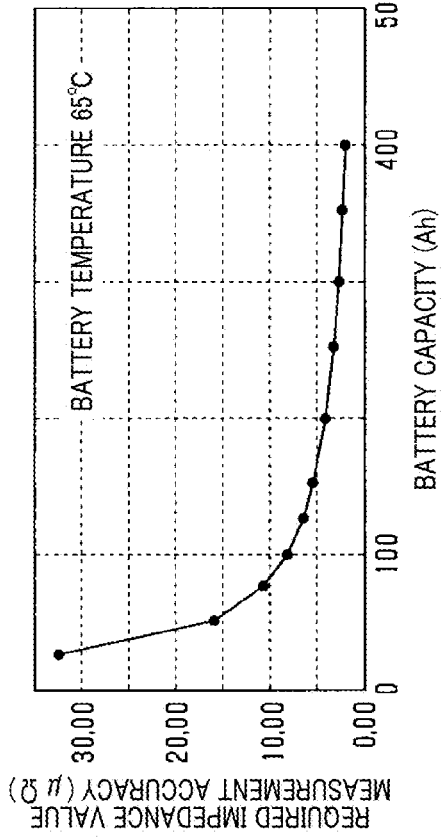
Figure 5D:
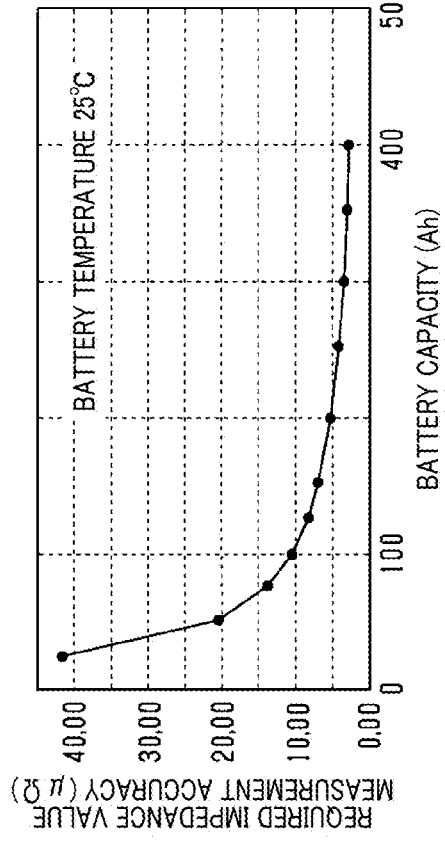

FIG. 4 is a configuration diagram of a connection mode between the battery measurement apparatus 50 and the battery cell 40 according to the present embodiment. As shown in FIG. 4, the second electrical path 82 includes a first detection line 82a that connects a first end of both ends of the resistor 56b and the measurement control unit 56e, and a second detection line 82b that connects a second end and the measurement control unit 56e.

The first detection line 82a is wired alongside the second detection line 82b to a branching point Br that is determined in advance. That is, the first detection line 82a and the second detection line 82b are wired in parallel to have as little gap therebetween as possible. The branching point Br is arranged near the resistor 56b. In addition, the branching point Br is arranged between the first end and the second end of the resistor 56b in a direction parallel to that in which the first end and the second end are arrayed. Furthermore, the first detection line 82a is separated from the second detection line 82b at the branching point Br.

In FIG. 4, the first detection line 82a and the second detection line 82b from the measurement control unit 56e to the branching point Br are wired to be orthogonal to the parallel direction in which the first end and the second end of the resistor 56b are arrayed. However, any manner of wiring is possible as long as the first detection line 82a and the second detection line 82b are wired alongside each other. In addition, when the first detection line 82a and the second detection 82b are wired alongside each other, the wiring need not be a straight line and may be arbitrarily curved as long as the first detection line 82a and the second detection line 82b are curved in a similar manner. Here, the first detection line 82a and the second detection line 82b are each covered by an insulating film. Alternatively, a gap that is enough to ensure insulation between the first detection line 82a and the second detection line 82b is provided therebetween.

According to the present embodiment described in detail above, the following effects can be achieved.

The area surrounded by the second electrical path 82, the resistor 56b, and the measurement control unit 56e (current detection amplifier 56c) is the magnetic flux passage area S10 through which the magnetic flux based on the alternating-current signal flowing on the first electrical path 81 passes. A magnitude of the induced electromotive force generated in the second electrical path 82 corresponds to a magnitude of the magnetic flux in the magnetic flux passage area S10 (more accurately, a magnitude of an amount of change over time in the magnetic flux).

Therefore, the size of the magnetic flux passage area S10 is set such that an error in the complex impedance due to the induced electromotive force generated in the second electrical path 82 is within a range of ±1 mΩ. As a result, the induced electromotive force based on the alternating-current signal being generated in the second electrical path 82 can be suppressed. The error in the complex impedance based on the induced electromotive force can be suppressed.

Here, a more preferable range will be described. FIGS. 5A to 5D show a relationship between battery capacity (Ah) of the battery cell 42 and impedance value measurement accuracy that is required. The impedance value measurement accuracy that is required indicates the accuracy that is required to determine a zero-crossing point. Here, as shown in FIGS. 5A to 5D, it is found that the impedance value measurement accuracy that is required changes based on the battery temperature (° C.) of the battery cell 42.

Therefore, in FIGS. 5A to 5D, when the battery capacity is within a range of 25 Ah to 800 Ah and the battery temperature is within a range of −10° C. to 65° C., if the size of the magnetic flux passage area S10 is set such that the error in the complex impedance due to the induced electromotive force generated in the second electrical path 82 based on the alternating-current signal flowing through the first electrical path 81 is within a range of ±170 μΩ, the impedance value measurement accuracy that is required for the above-described range of battery capacity and range of battery temperature can be met.

Here, a method for identifying the error in the complex impedance due to the induced electromotive force generated in the second electrical path 82 based on the alternating-current signal flowing through the first electrical path 81 will be described.

Expression (2) shows a calculation formula for calculating a current signal Is. Here, Im denotes a current signal actually flowing through the first electrical path 81. j denotes an imaginary unit. Ωr denotes a measurement frequency that is a frequency of the alternating-current signal when the current signal Is is measured. ΣI denotes a shape parameter that is a parameter due to the induced electromotive force generated in the second electrical path 82. The shape parameter ΣI is proportional to the size of the second electrical path 82.

In a center expression in expression (2), a first term of a numerator indicates a voltage drop caused by the current signal Im actually flowing through the first electrical path 81. A second term of the numerator indicates the induced electromotive force generated in the second electrical path 82. In addition, in an expression on the right side of expression (2), a second term of an expression within parentheses indicates a measurement error due to the induced electromotive force when Im is 1. The expression within the parentheses in the expression on the right side of expression (2) is expressed as in expression (3) below using a phase θ. The phase θ is expressed as in expression (4) below.

$$Is = \frac{ImRs - j\omega r \sum I \cdot Im}{Rs} = Im\left(1 - \frac{j\omega r \sum I}{Rs}\right) \quad (2)$$

$$1 - \frac{j\omega r \sum I}{Rs} = \sqrt{1 + \left(\frac{\omega r \sum I}{Rs}\right)^2} \cdot e^{-j\theta} \quad (3)$$

-continued $$\theta = \tan^{-1}\frac{\omega r \sum I}{Rs} \quad (4)$$

A calculation formula for complex impedance Zm calculated by the microcomputer unit 53 is expressed as in expression (5) using expression (2). Here, Vs denotes the inter-terminal voltage of the battery cell 42 from which a direct-current voltage component is removed, that is, a voltage change component resulting from modulation. Zb denotes a complex impedance expressed by a ratio of Vs to Im.

$$Zm = \frac{-Vs}{Im\left(1 - \frac{j\omega r \sum I}{Rs}\right)} = \frac{-\frac{Vs}{Im}}{1 - \frac{j\omega r \sum I}{Rs}} = \frac{-Zb}{\sqrt{1 + \left(\frac{\omega r \sum I}{Rs}\right)^2} \cdot e^{-j\theta}} \quad (5)$$

In addition, in the battery measurement apparatus 50, because the current detection amplifier 56 is an operator amplifier, a current hardly flows from the first electrical path 81 to the second electrical path 82 and a current signal hardly flows through the second electrical path 82.

Therefore, the current signal flowing through the second electrical path 82 is sufficiently smaller than the current signal flowing through the first electrical path 81. In this case, the induced electromotive force generated in the second electrical path 82 can be considered to be that caused by the alternating-current signal flowing through the first electrical path 81. When mutual inductance between the first electrical path 81 and the second electrical path 82 is MI, the shape parameter ΣI is expressed as ΣI=±MI. Therefore, expression (5) and expression (4) are expressed as in expression (6) and expression (7).

$$Zm = \frac{-Zb}{\sqrt{1 + \left(\frac{\omega r MI}{Rs}\right)^2} \cdot e^{-j\theta}} \quad (6)$$

$$\theta = \tan^{-1}\frac{\pm \omega r MI}{Rs} \quad (7)$$

The error in the complex impedance due to the induced electromotive force generated in the second electrical path 82 based on the alternating-current signal flowing through the first electrical path 81 is expressed as (Zb−Zm) using expression (6) and expression (7). Here, the measurement frequency ωr can be set during measurement of the current signal and the resistance value Rs of the resistor 56b is a preset value. In addition, the mutual inductance MI can be calculated by simulation or actual measurement using the size of the magnetic flux passage area S10, and the distance between the first electrical path 81 and the second electrical path 82. Specifically, a simulation can be performed by a finite element method using the right side of expression (1). Therefore, as a result of expression (6) and expression (7), the error in the complex impedance due to the induced electromotive force generated in the second electrical path 82 based on the alternating-current signal flowing through the first electrical path 81 can be identified.

According to the present embodiment, the size of the magnetic flux passage area S10, that is, the shape parameter ΣI is set such that the error expressed using expression (6) and expression (7) is within the above-described range (±1 mΩ or ±170μΩ) under predetermined measurement conditions. Here, the measurement conditions are that the battery capacity ranges from 25 Ah to 800 Ah and the battery temperature ranges from −10° C. to 65° C.

Variation Example 1 According to the First Embodiment

A variation example 1 according to the first embodiment will be described below, mainly focusing on differences with the first embodiment.

Setting of the size of the magnetic flux passage area S10 is not limited to that using the error in the complex impedance due to the induced electromotive force generated in the second electrical path 82 based on the alternating-current signal flowing through the first electrical path 81. The size of the magnetic flux passage area S10 may be set such that the induced electromotive force generated in the second electrical path 82 is within an electromotive force allowable-value range including zero. In the present variation example, a range of ±200 μV with zero at the center is set as the electromotive force allowable-value range. As a result, the induced electromotive force based on the alternating-current signal generated in the second electrical path 82 can be suppressed. The error in the complex impedance based on the induced electromotive force can be suppressed.

Variation Example 2 According to the Second Embodiment

Figure 6:
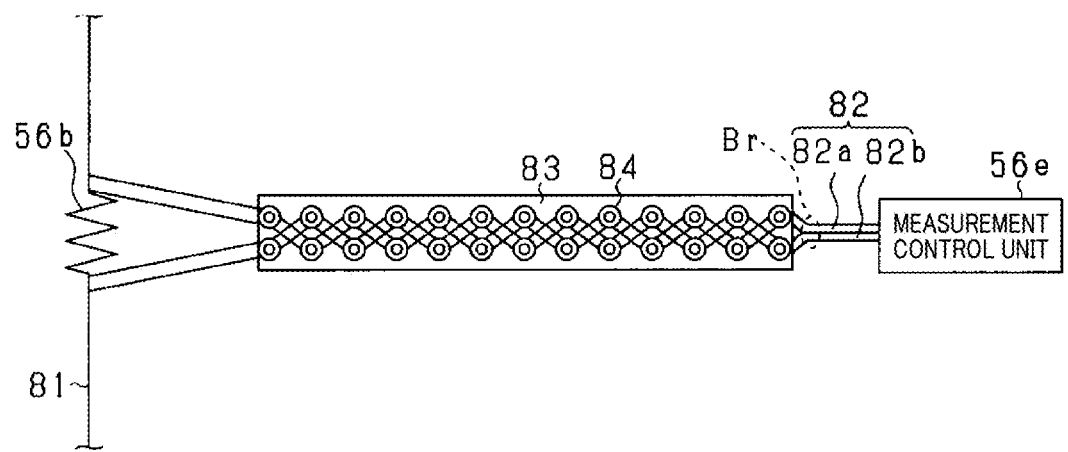
FIG. 6 is a configuration diagram illustrating a connection mode between the battery measurement apparatus and the battery cell in a variation example 2 according to the first embodiment.

Hereafter, a variation example 2 according to the first embodiment will be described with reference to the drawings, mainly focusing on differences with the first embodiment. As shown in FIG. 6, the present variation example differs from the first embodiment in that the first detection line 82a is wired to intersect the second detection line 82b a plurality of times. The first detection line 82a and the second detection line 82b are provided on a printed board 83 that serves as a fixing member. The first detection line 82a and the second detection line 82b are wired to intersect each other by being arranged on differing layers using a through hole 84 formed in the printed board 83.

Figure 7:
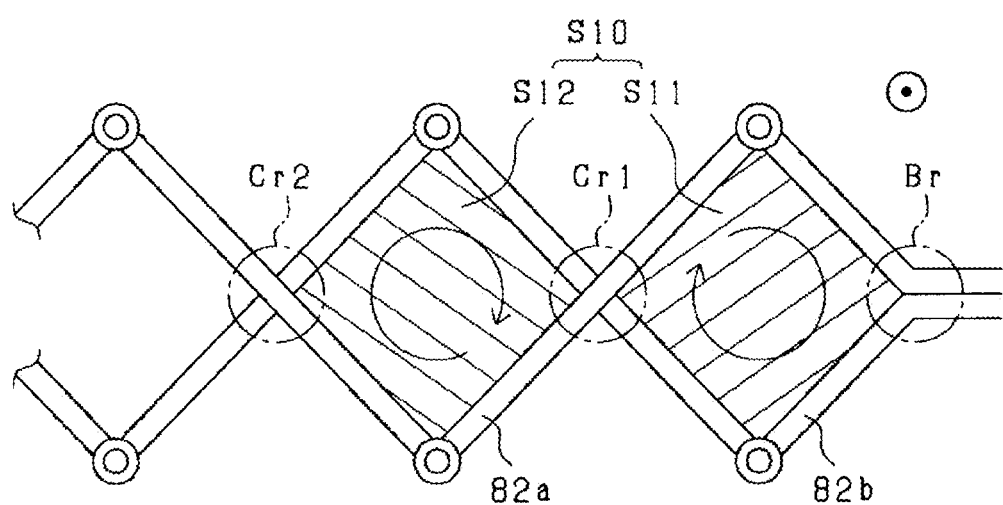
FIG. 7 is an explanatory diagram illustrating a first electrical path in the variation example 2 according to the first embodiment.

Specifically, with reference to FIG. 7, the first detection line 82a separates from the second detection line 82b at the branching point Br and then intersects the second detection line 82b at a first intersection point Cr1. In addition, the first detection line 82a separates from the second detection line 82b after passing the first intersection point Cr1 and then intersects the second detection line 82b again at a second intersection point Cr2.

As a result, the magnetic flux passage area S10 is divided into a plurality of areas including a first magnetic flux passage area S11 that is surrounded by the branching point Br, the first intersection point Cr1, the first detection line 82a, and the second detection line 82b, and a second magnetic flux passage area S12 that is surrounded by the first intersection point Cr1, the second intersection point Cr2, the first detection line 82a, and the second detection line 82b.

For example, as a result of the alternating-current signal flowing on the first electrical path 81, a magnetic flux that is oriented from a back side on a paper surface towards a front side may be generated in the magnetic flux passage areas S11 and S12. In this case, a direction in which the current flows in the magnetic flux passage areas S11 and S12 as a result of the induced electromotive force is counter-clockwise as shown in FIG. 7. In addition, a positional relationship between the first detection line 82a and the second detection line 82b is reversed at the first intersection point Cr1.

Therefore, at the first intersection point Cr1, phases of the induced electromotive force generated in the first magnetic flux passage area S11 and the induced electromotive force generated in the second magnetic flux passage area S12 are shifted by 180 degrees. That is, the induced electromotive forces cancel each other out. As a result, the induced electromotive force based on the alternating-current signal generated in the second electrical path 82 can be suppressed. The error in the complex impedance based on the induced electromotive force can be suppressed.

Second Embodiment

Next, the battery measurement apparatus 50 according to a second embodiment will be described mainly focusing on the differences with the first embodiment. Hereafter, sections among the embodiments that are identical or equivalent are given the same reference numbers. Descriptions of sections having the same reference numbers are applicable therebetween. In addition, according to the second embodiment, as a basic configuration, a basic configuration according to the first embodiment will be described as an example.

According to the present embodiment, in addition to the size of the magnetic flux passage area S10, the resistance value Rs of the resistor 56 is set such that the error in the induced electromotive force generated in the second electrical path 82 based on the alternating-current signal flowing through the first electrical path 81 or the complex impedance due to the induced electromotive force is within a predetermined range (within ±1 mΩ, ±170μΩ, or the electromotive force allowable-value range).

Based on expression (6) and expression (7), the complex impedance Zm calculated by the microcomputer unit 53 is expressed using ωr×MI/Rs. It is found that, if ωr×MI/Rs is reduced, the error in the complex impedance due to the induced electromotive force generated in the second electrical path 82 based on the alternating-current signal flowing through the first electrical path 81 can be reduced. Therefore, the resistance value Rs of the resistor 56b is set to be as large as possible to reduce ωr×MI/Rs.

That is, in addition to setting the size of the magnetic flux passage area S10, the resistance value Rs of the resistor 56b is set such that the induced electromotive force generated in the second electrical path 82 based on the alternating-current signal flowing through the first electrical path 81 or the error in the complex impedance due to the induced electromotive force is within the predetermined range. As a result, the error in the complex impedance based on the induced electromotive force can be suppressed.

Third Embodiment

Next, the battery measurement apparatus 50 according to a third embodiment will be described mainly focusing on the differences with the first embodiment. Hereafter, sections among the embodiments that are identical or equivalent are given the same reference numbers. Descriptions of sections having the same reference numbers are applicable therebetween. In addition, according to the third embodiment, as a basic configuration, a basic configuration according to the first embodiment will be described as an example.

According to the present embodiment, a ratio of the resistance value Rs and the size of the magnetic flux passage area S10 is set such that the induced electromotive force generated in the second electrical path 82 based on the alternating-current signal flowing through the first electrical path 81 or the error in the complex impedance due to the induced electromotive force is within a predetermined range (within ±1 mΩ, ±170μΩ, or the electromotive force allowable-value range).

As shown in expression (6) and expression (7), if ωr×MI/Rs is reduced, the error in the complex impedance due to the induced electromotive force generated in the second electrical path 82 based on the alternating-current signal flowing through the first electrical path 81 can be reduced. In this case, when the resistance value Rs is set to be excessively large to reduce ωr×MI/Rs, power loss in the resistor 56b increases and an amount of heat generation in the resistor 56b increases. Thermal drift accompanying the increase in temperature in the resistor 56b occurs. Therefore, the ratio of the resistance value Rs and the size of the magnetic flux passage area S10 is appropriately set to suppress the resistance value Rs from becoming excessively large while reducing ωr×MI/Rs.

Specifically, MI/Rs is appropriately set. The mutual inductance MI is proportional to the size of the second electrical path 82. Therefore, MI/Rs corresponds to a ratio of the resistance value Rs of the resistor 56b and the size of the magnetic flux passage area S10. According to the present embodiment, the MI/Rs is set to be as small as possible to reduce the ωr×MI/Rs.

That is, ωr×MI/Rs is set such that the induced electromotive force generated in the second electrical path 82 based on the alternating-current signal flowing through the first electrical path 81 or the error in the complex impedance due to the induced electromotive force is within the predetermined range. Through use of ωr×MI/Rs, the error in the complex impedance can be suppressed while suppressing increase in the resistance value Rs. As a result, thermal drift and power loss caused by the increase in the resistance value Rs can be suppressed.

Fourth Embodiment

Next, the battery measurement apparatus 50 according to a fourth embodiment will be described mainly focusing on the differences with the first embodiment. Hereafter, sections among the embodiments that are identical or equivalent are given the same reference numbers. Descriptions of sections having the same reference numbers are applicable therebetween. In addition, according to the fourth embodiment, as a basic configuration, a basic configuration according to the first embodiment will be described as an example.

According to the present embodiment, the complex impedance calculated by the microcomputer unit 53 is corrected such that the induced electromotive force generated in the second electrical path 82 based on the alternating-current signal flowing through the first electrical path 81 or the error in the complex impedance due to the induced electromotive force is within a predetermined range (within ±1 mΩ, ±170μΩ, or the electromotive force allowable-value range).

Based on expression (6) and expression (7), the complex impedance Zm calculated by the microcomputer unit 53 is expressed using ωr×MI/Rs. The microcomputer unit 53 that serves as a correcting unit can correct the complex impedance Zm by calculating ωr×MI/Rs.

According to the present embodiment, the first electrical path 81 and the second electrical path 82 are fixed on the same printed board 83. That is, the positional relationship and sizes of the first electrical path 81 and the second electrical path 82 are fixed. Therefore, the mutual inductance MI can be accurately calculated by simulation. Thus, ωr×MI/Rs can be calculated using these values. The error in the complex impedance Zm can be suppressed by the complex impedance Zm being corrected using ωr×MI/Rs.

Figure 8:
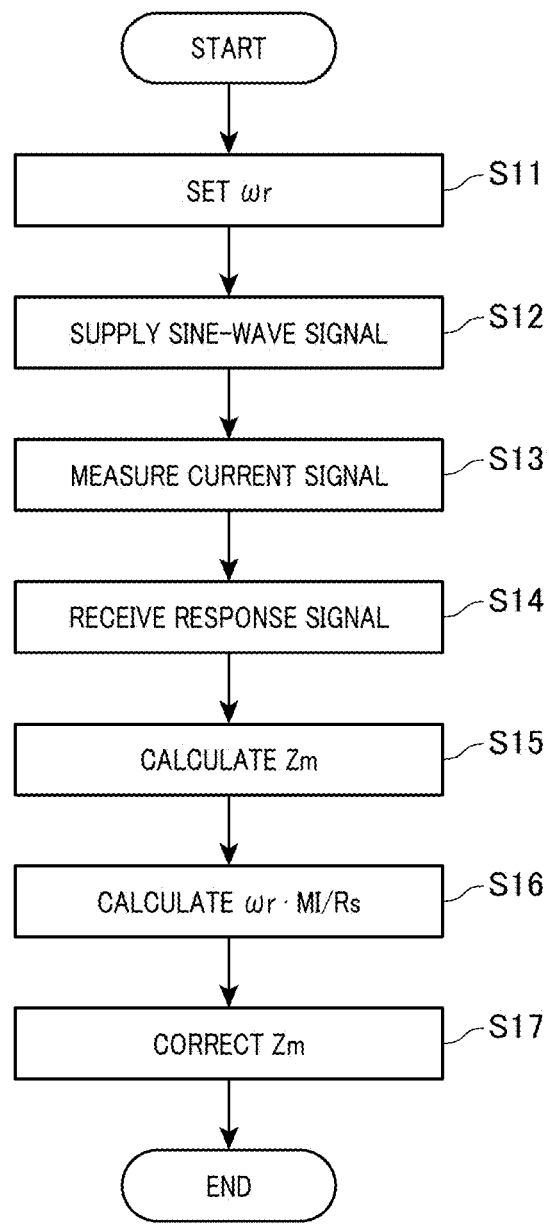
FIG. 8 is a flowchart illustrating an impedance correction process.

Next, a battery state measurement method for the battery cell 42 will be described. The battery measurement apparatus 50 performs an impedance correction process shown in FIG. 8 at a predetermined cycle.

In the impedance correction process, first, the microcomputer unit 53 sets the measurement frequency ωr of the complex impedance Zm (step S11). The measurement frequency ωr is set from among frequencies within a measurement range determined in advance.

Next, the microcomputer unit 53 determines a frequency of a sine-wave signal based on the measurement frequency ωr and supplies an instruction signal that instructs the input/output unit 52 to supply the sine-wave signal (step S12). Here, according to the present embodiment, the process at step S12 corresponds to a signal control step.

When the instruction signal is received, the input/output unit 52 converts the instruction signal to an analog signal by the DA converter and supplies the analog signal to the current modulation circuit 56. The current modulation circuit 56 supplies a sine-wave signal with the battery cell 42 as the power supply, based on the instruction signal. Specifically, the semiconductor switch element 56a adjusts the current signal based on the signal received through the feedback circuit 56d, so that the sine-wave signal designated by the instruction signal is supplied from the battery cell 42. As a result, the sine-wave signal is supplied from the battery cell 42.

When the sine-wave signal is supplied from the battery cell 42, that is, when external disturbance is applied to the battery cell 42, voltage variation reflecting the internal complex impedance of the battery cell 42 is generated between terminals of the battery cell 42. The input/output unit 52 receives the voltage variation through the response signal input terminal 58 and supplies the voltage variation as a response signal to the microcomputer unit 53. At this time, the response signal is converted to a digital signal by the AD converter and supplied.

After execution of step S12, the microcomputer unit 53 measures the current signal using the measurement control unit 56e that serves as the alternating-current signal measuring unit (step S13). In addition, the microcomputer unit 53 receives the response signal from the input/output unit (step S14). Here, according to the present embodiment, the process at step S13 corresponds to an alternating-current signal measuring step. The process at step S14 corresponds to a response signal input step.

Next, the microcomputer unit 53 calculates information related to the complex impedance Zm of the battery cell 42 based on the current signal and the response signal (step S15). Here, according to the present embodiment, the process at step S15 corresponds to a calculating step.

Next, the microcomputer unit 53 calculates ωr×MI/Rs using the measurement frequency ωr (step S16). Here, the mutual inductance MI and the resistance value Rs of the resistor 56b are acquired in advance and stored in the microcomputer unit 53.

Next, the microcomputer unit 53 corrects the complex impedance Zm using the ωr×MI/Rs (step S17). The complex impedance Zm is corrected based on expression (6) and expression (7). The microcomputer unit 53 supplies information related to the complex impedance Zm after correction to the ECU 60 through the communication unit 54.

Then, the impedance correction process is ended. Here, according to the present embodiment, the process at step S17 corresponds to a correcting step.

According to the present embodiment described in detail above, the following effects are achieved.

When the current signal flowing through the second electrical path 82 is sufficiently smaller than the current signal flowing through the first electrical path 81, the complex impedance Zm calculated by the microcomputer unit 53 is expressed as in expression (6) and expression (7). Here, ωr×MI/Rs included in expression (6) and expression (7) is a value that can be calculated by simulation or the like.

Therefore, the complex impedance that is calculated by the microcomputer unit 53 is corrected using ωr×MI/Rs such that the induced electromotive force generated in the second electrical path 82 based on the alternating-current signal flowing through the first electrical path 81 or the error in the complex impedance due to the induced electromotive force is within the predetermined range. As a result, error in the complex impedance can be suppressed.

According to the present embodiment, the first electrical path 81 and the second electrical path 82 are fixed by the same printed board 83. As a result, the positional relationship and sizes of the first electrical path 81 and the second electrical path 82 are fixed, and a first mutual inductance can be accurately calculated. Consequently, ωr×MI/Rs can be accurately calculated, and the error in the complex impedance based on the induced electromotive force can be favorably suppressed.

Other Embodiments

According to the above-described embodiments, the alternating-current signal is not limited to the sine-wave signal. For example, the alternating-current signal may be a rectangular-wave or a triangular-wave signal. Alternatively, the alternating-current signal may be a composite wave of arbitrary frequencies including the measurement frequency or.

According to the above-described embodiments, the calculating unit such as the microcomputer unit 53 is not required to calculate an absolute value and a phase difference of the complex impedance, and can calculate information related to the complex impedance based on the response signal and the current signal, and supply the information to an external apparatus such as the ECU 60. Here, for example, the information related to the complex impedance may be on-going status (such as only real parts and imaginary parts of currents and voltages) required to calculate the absolute value, the phase difference, and the like of the complex impedance. In addition, an external apparatus may calculate a final result, that is, the absolute value, the phase difference, and the like of the complex impedance.

In the variation example 2 according to the first embodiment described above, the magnetic flux passage area S10 is divided into three or more, but may be divided into two. In this case, the first detection line 82a and the second detection line 82b only intersect once.

According to the above-described embodiments, the first and second electrical paths 81 and 82 may be fixed by the printed board or may be fixed by a resin mold serving as a fixing member. When a cable is included, a configuration for fixing the cable may be provided. In addition, when a semiconductor integrated circuit is included, a wiring pattern related to the semiconductor integrated circuit may be fixed.

According to the above-described embodiments, the battery measurement apparatus 50 is provided for each battery module 41. However, for example, the battery measurement apparatus 50 may be provided for each battery cell 42 or for each assembled battery 40. In addition, when the battery measurement apparatus 50 is provided for every plurality of battery cells 42, a portion of functions of the battery measurement apparatus 50 may be shared.

Figure 9:
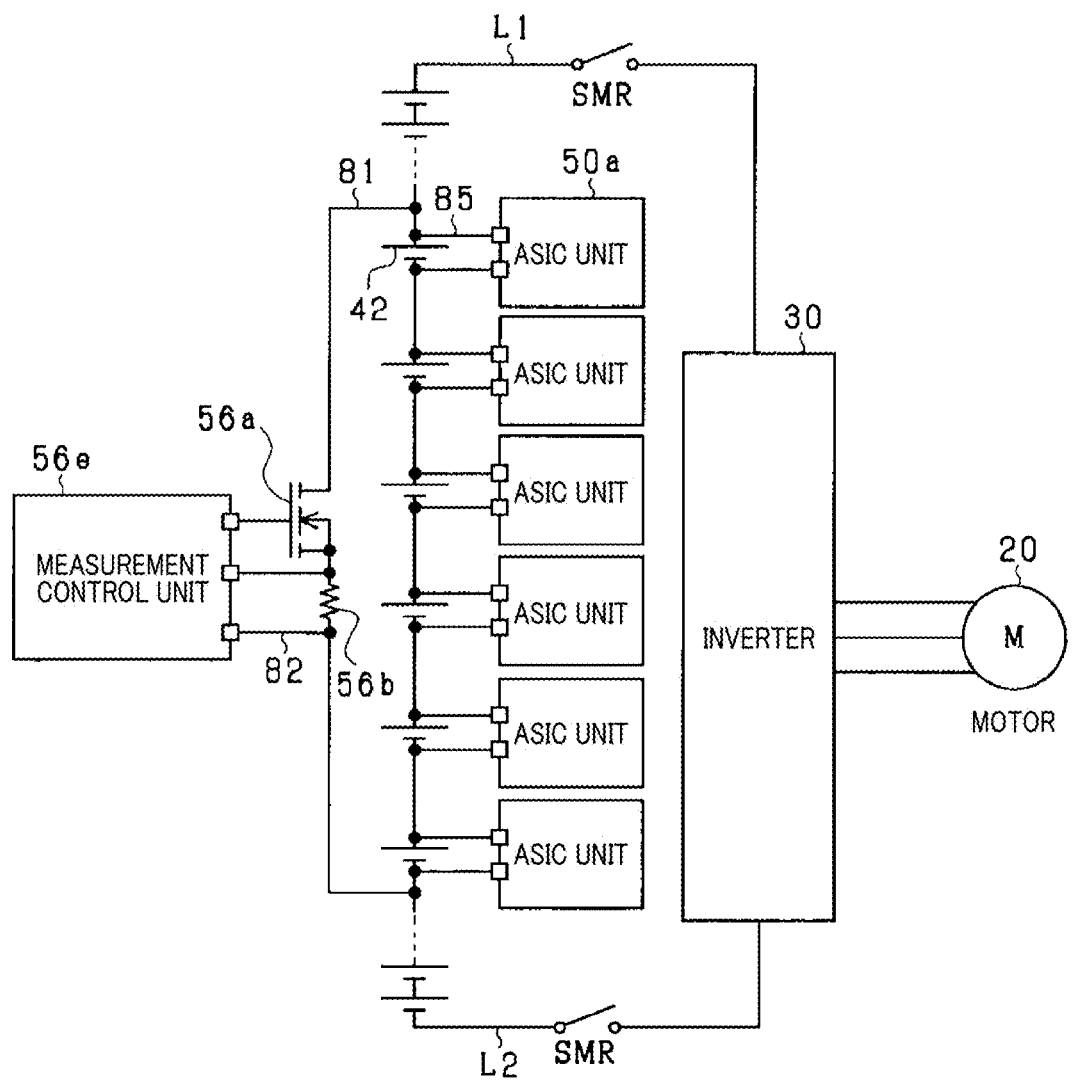
FIG. 9 is a configuration diagram illustrating a connection state of a first electrical path and a second electrical path according to another embodiment.
Figure 10:
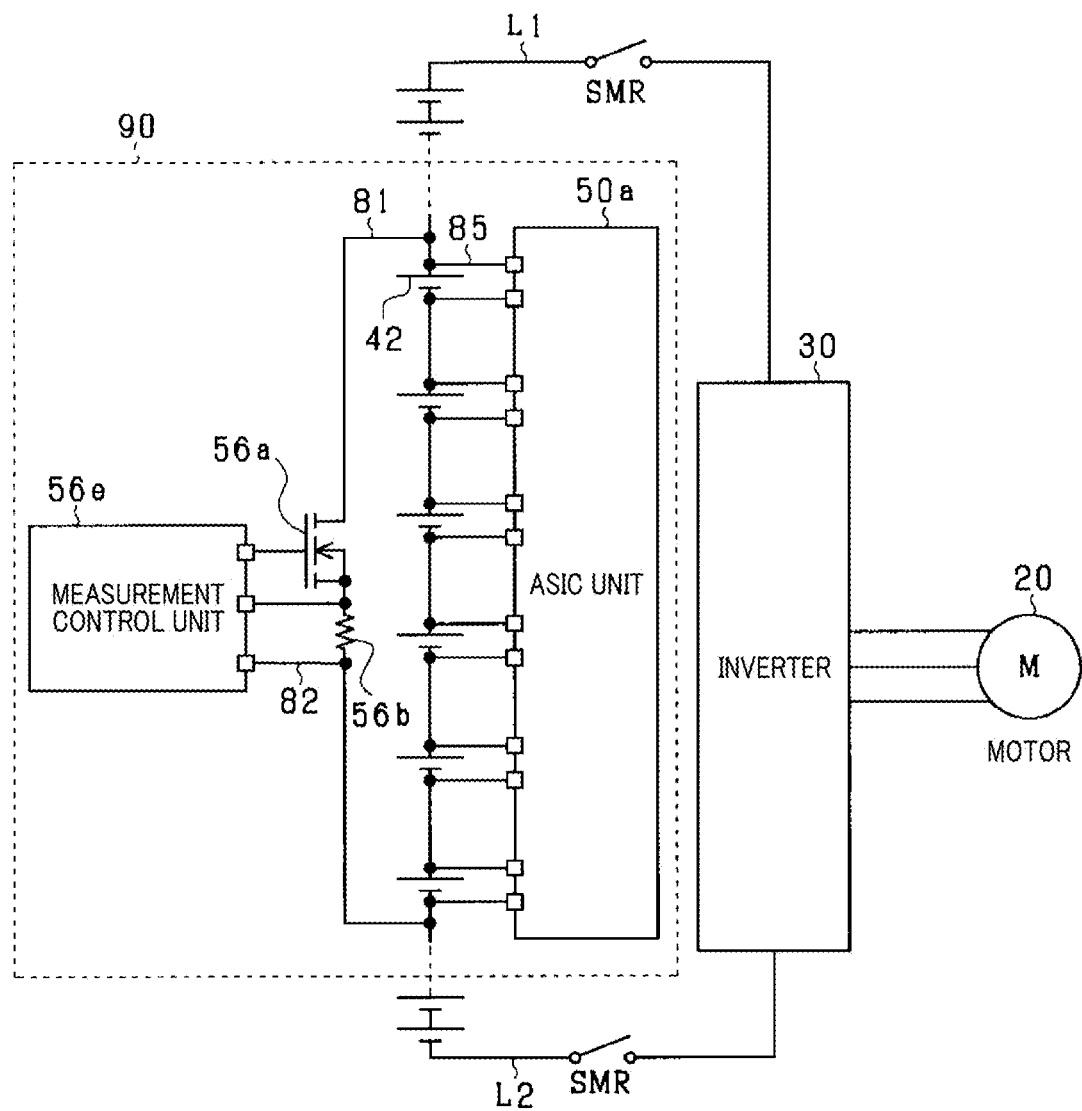
FIG. 10 is a configuration diagram illustrating a connection state of a first electrical path and a second electrical path according to another embodiment.
Figure 11:
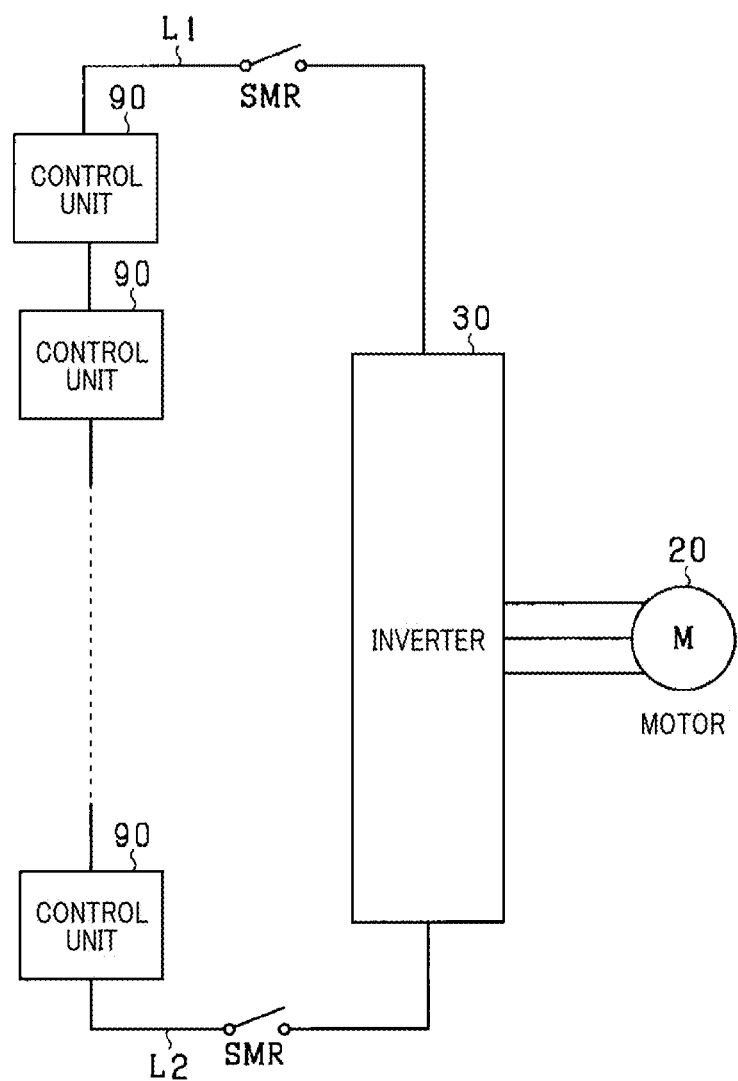
FIG. 11 is a configuration diagram illustrating a connection state of a control unit according to another embodiment.

For example, as shown in FIG. 9, while the ASIC unit 50a is provided for each battery cell 42, the measurement control unit 56e may be provided for every six battery cells 42. The measurement control unit 56e corresponding to these battery cells 42 may be shared. In addition, as shown in FIG. 10, the ASIC unit 50a and the measurement control unit 56e may be provided for every six battery cells 42. A control unit 90 in which the ASIC unit 50a and the measurement control unit 56e corresponding to these battery cells 42 are shared may be provided. Furthermore, as shown in FIG. 11, the assembled battery 40 and the battery measurement apparatus 50 may be configured by a plurality of control units 90 being connected in series.

Figure 12:
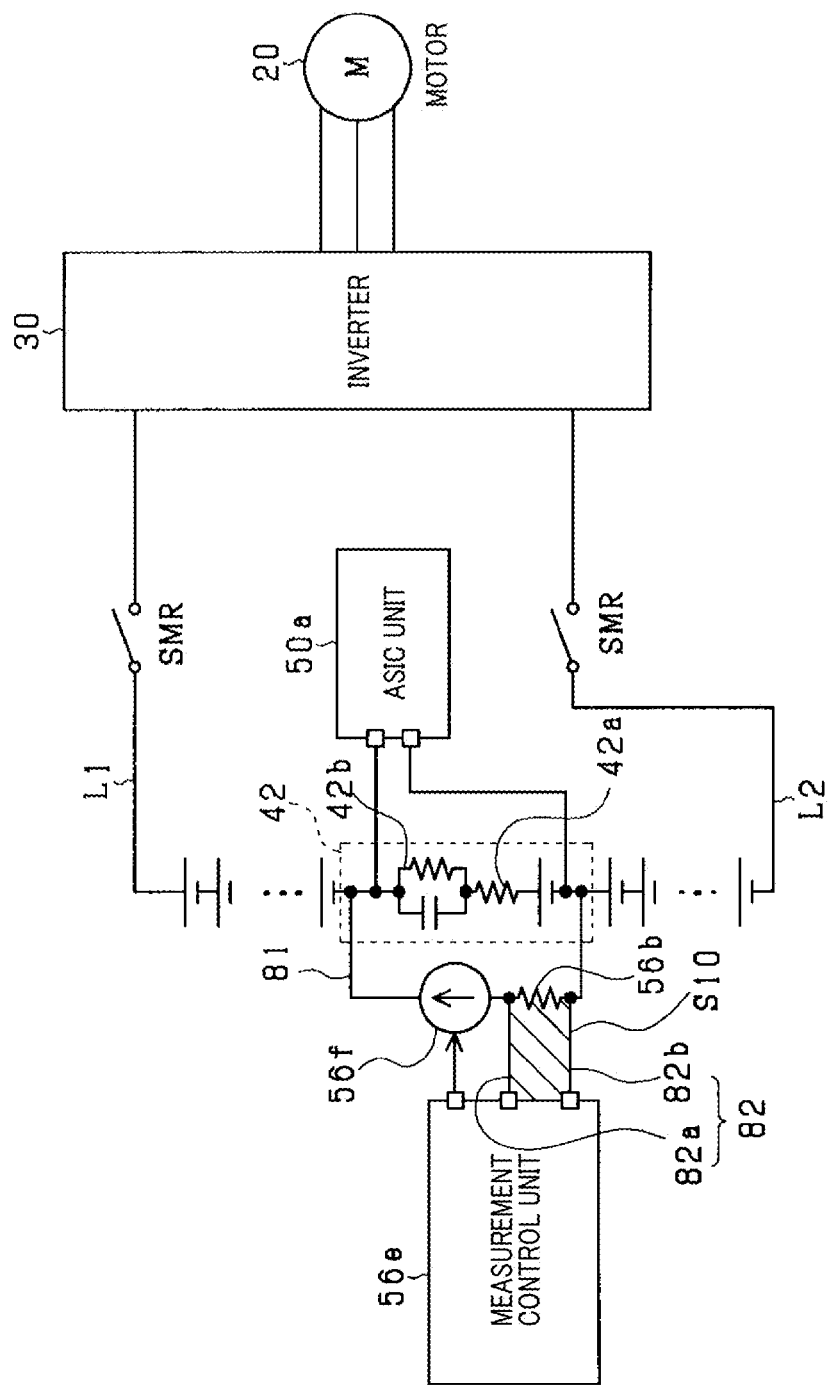
FIG. 12 is a configuration diagram illustrating a connection state of a first electrical path and a second electrical path according to another embodiment.

According to the above-described embodiments, the alternating-current signal is supplied from the battery cell 42. However, the alternating-current signal may be received to the battery cell 42 from an external power supply and external disturbance may be applied. For example, as shown in FIG. 12, the current modulation circuit 56 may have a current source 56f instead of the semiconductor switch element 56a. The current source 56f is connected between the positive electrode of the battery cell 42 and the resistor 56b on the first electrical path 81, and is connected in series to the resistor 56b.

The current source 56f receives the alternating-current signal designated by the instruction signal to the battery cell 42 based on the signal from the measurement control unit 56e (feedback circuit 56d). Here, when an error has occurred between a waveform designated by the instruction signal and a waveform actually flowing to the resistor 56b, the current source 56f adjusts the alternating-current signal based on the signal from the measurement control unit 56b such that the error is corrected. As a result, the alternating-current signal flowing to the resistor 56b is stabilized.

Figure 13:
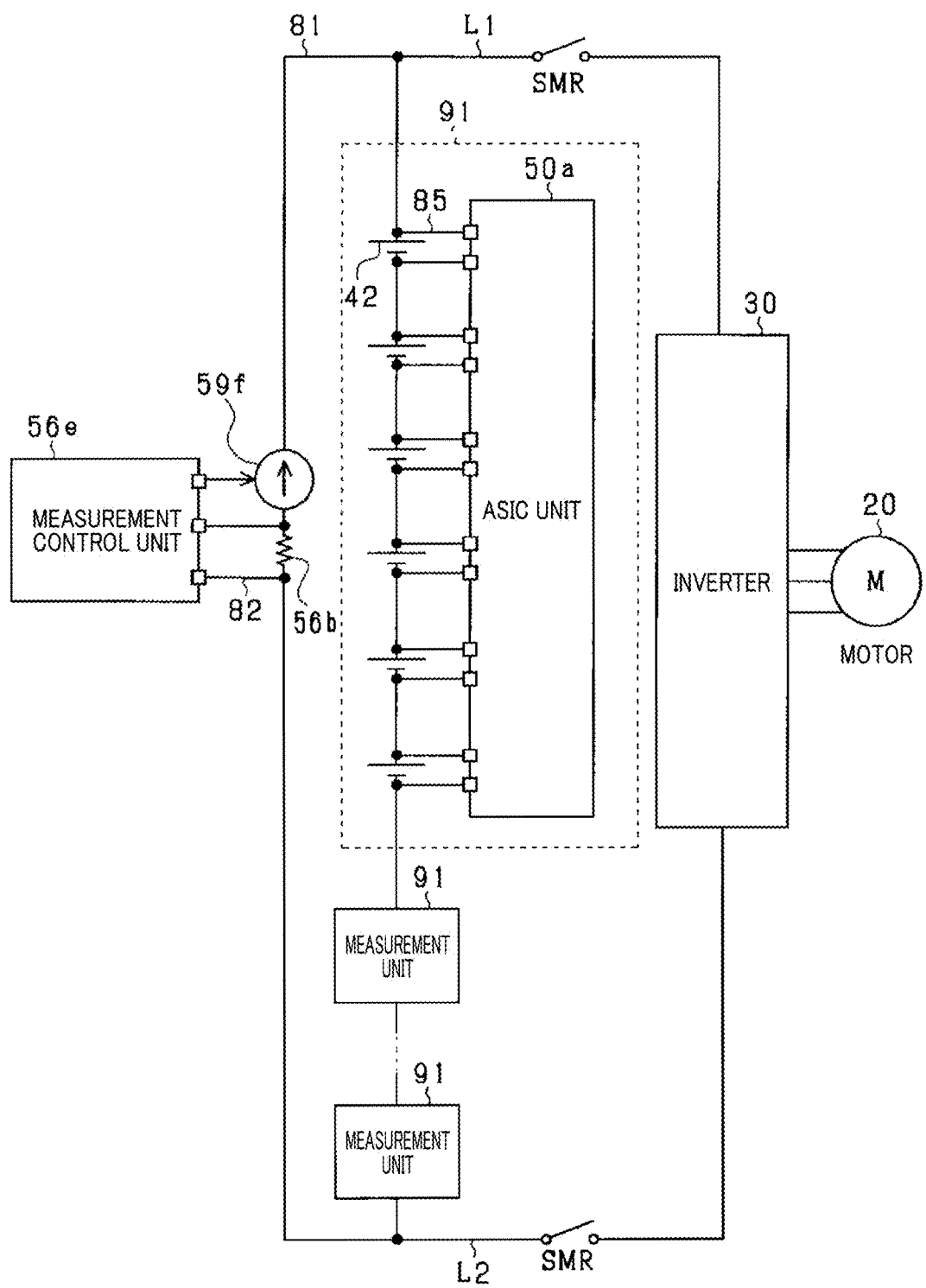
FIG. 13 is a configuration diagram illustrating a connection state of a measurement unit according to another embodiment.

In this case, as shown in FIG. 13, the ASIC unit 50a may be provided for every six battery cells 42, and a measurement unit 91 in which the ASIC unit 50a corresponding to these battery cells 42 is shared may be provided. Furthermore, a plurality of measurement units 91 may be connected in series, and a single measurement control unit 56e may be provided for these measurement units 91. The measurement control unit 56e corresponding to these measurement units 91 may be shared.

According to the above-described embodiments, the battery measurement apparatus 50 is applied to the power supply system of a vehicle. However, the battery measurement apparatus 50 may be applied to a power supply system of an electric aircraft or an electric ship.

The control unit and the method thereof described in the present disclosure may be actualized by a dedicated computer that is provided such as to be configured by a processor and a memory, the processor being programmed to provide one or a plurality of functions that are realized by a computer program. Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) recording medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A battery measurement apparatus that measures a state of a storage battery, the battery measurement apparatus comprising:
    a signal control unit that is provided on a first electrical path connecting a positive electrode and a negative electrode of the storage battery, and causes the storage battery to supply a predetermined alternating-current signal or receive a predetermined alternating-current signal to the storage battery;
    an alternating-current signal measuring unit that is provided on a second electrical path differing from the first electrical path and measures the alternating-current signal flowing through the first electrical path via the second electrical path;
    a response signal input unit that receives a response signal of the storage battery that is in response to the alternating-current signal; and
    a calculating unit that calculates information related to a complex impedance of the storage battery based on the alternating-current signal and the response signal, wherein
    a magnetic flux passage area is defined as an area surrounded by the second electrical path and through which a magnetic flux based on the alternating-current signal flowing through the first electrical path passes, and
    a size of the magnetic flux passage area is set such that an error in the complex impedance due to induced electromotive force generated in the second electrical path based on the alternating-current signal flowing through the first electrical path is within a range of ±1 mΩ.

2. The battery measurement apparatus according to claim 1, wherein:
    when a battery capacity of the storage battery is within a range of 25 Ah to 800 Ah and the battery temperature is within a range of −10° ° C. to 65° C., the size of the magnetic flux passage area is set such that the error in the complex impedance due to induced electromotive force generated in the second electrical path based on the alternating-current signal flowing through the first electrical path is within a range of ±170μΩ.

3. A battery measurement apparatus that measures a state of a storage battery, the battery measurement apparatus comprising:
    a signal control unit that is provided on a first electrical path connecting a positive electrode and a negative electrode of the storage battery, and causes the storage battery to supply a predetermined alternating-current signal or receive a predetermined alternating-current signal to the storage battery;
    an alternating-current signal measuring unit that is provided on a second electrical path differing from the first electrical path and measures the alternating-current signal flowing through the first electrical path via the second electrical path;
    a response signal input unit that receives a response signal of the storage battery that is in response to the alternating-current signal; and
    a calculating unit that calculates information related to a complex impedance of the storage battery based on the alternating-current signal and the response signal, wherein
    a magnetic flux passage area is defined as an area surrounded by the second electrical path and through which a magnetic flux based on the alternating-current signal flowing through the first electrical path passes, and
    a size of the magnetic flux passage area is set such that induced electromotive force generated in the second electrical path based on the alternating-current flowing through the first electrical path is within an electromotive force allowable-value range including zero.

4. The battery state measurement apparatus according to claim 3, wherein:
    the alternating-current signal measuring unit measures the alternating-current signal using a resistor that is provided on the first electrical path;
    the second electrical path has a first detection line that connects a first end of both ends of the resistor and the alternating-current signal measuring unit, and a second detection line that connects a second end and the alternating-current signal measuring unit; and
    the first detection line is wired to intersect the second detection line one or a plurality of times.

5. The battery measurement apparatus according to claim 4, wherein:
    the alternating-current signal measuring unit measures the alternating-current signal using a resistor that is provided on the first electrical path; and
    a resistance value of the resistor and the size of the magnetic flux passage area are set such that the induced electromotive force generated in the second electrical path based on the alternating-current signal flowing through the first electrical path or the error in the complex impedance due to the induced electromotive force is within the range.

6. The battery measurement apparatus according to claim 5, wherein:
    a ratio of the resistance value of the resistor and the size of the magnetic flux passage area is set such that the induced electromotive force generated in the second electrical path based on the alternating-current signal flowing through the first electrical path or the error in the complex impedance due to the induced electromotive force is within the range.

7. The battery measurement apparatus according to claim 6, wherein
    the alternating-current signal measuring unit measures the alternating-current signal using a resistor that is provided on the first electrical path; and
    the battery measurement apparatus comprises a correcting unit that corrects the complex impedance calculated by the calculating unit using $\omega r \times MI/Rs$, where a frequency of the alternating-current signal is $\omega r$, mutual inductance between the first electrical path and the second electrical path is MI, and a resistance value of the resistor is Rs.

8. A battery measurement apparatus that measures a state of a storage battery, the battery measurement apparatus comprising:
   a signal control unit that is provided on a first electrical path connecting a positive electrode and a negative electrode of the storage battery, and causes the storage battery to supply a predetermined alternating-current signal or receive a predetermined alternating-current signal to the storage battery;
   an alternating-current signal measuring unit that is provided on a second electrical path differing from the first electrical path and measures the alternating-current signal flowing through the first electrical path via the second electrical path;
   a response signal input unit that receives a response signal of the storage battery that is in response to the alternating-current signal; and
   a calculating unit that calculates information related to a complex impedance of the storage battery based on the alternating-current signal and the response signal, wherein
   the alternating-current signal measuring unit measures the alternating-current signal using a resistor that is provided on the first electrical path; and
   the battery measurement apparatus comprises a correcting unit that corrects the complex impedance calculated by the calculating unit using ωr×MI/Rs, where a frequency of the alternating-current signal is ωr, mutual inductance between the first electrical path and the second electrical path is MI, and a resistance value of the resistor is Rs.

9. The battery measurement apparatus according to claim 8, wherein:
   a fixing member that fixes the first electrical path and the second electrical path is provided.

10. A battery state measurement method performed by a battery measurement apparatus that measures a state of a storage battery, the battery state measurement method comprising:
   a signal control step of causing the storage battery to supply a predetermined alternating-current signal or receive a predetermined alternating-current signal to the storage battery through a first electrical path connecting a positive electrode and a negative electrode of the storage battery;
   an alternating-current signal measuring step of measuring the alternating-current signal flowing through the first electrical path via the second electrical path that differs from the first electrical path;
   a response signal input step of receiving a response signal of the storage battery that is in response to the alternating-current signal; and
   a calculating step of calculating information related to a complex impedance of the storage battery based on the alternating-current signal and the response signal, wherein
   at the alternating-current signal measuring step, the alternating-current signal is measured using a resistor that is provided on the first electrical path, and the battery state measurement method further comprises
   a correcting step of correcting the complex impedance calculated at the calculating step using ωr×MI/Rs, where a frequency of the alternating-current signal is Ωr, mutual inductance between the first electrical path and the second electrical path is MI, and a resistance value of the resistor is Rs.

11. The battery state measurement apparatus according to claim 1, wherein:
   the alternating-current signal measuring unit measures the alternating-current signal using a resistor that is provided on the first electrical path;
   the second electrical path has a first detection line that connects a first end of both ends of the resistor and the alternating-current signal measuring unit, and a second detection line that connects a second end and the alternating-current signal measuring unit; and
   the first detection line is wired to intersect the second detection line one or a plurality of times.

12. The battery measurement apparatus according to claim 11, wherein:
   the alternating-current signal measuring unit measures the alternating-current signal using a resistor that is provided on the first electrical path; and
   a resistance value of the resistor and the size of the magnetic flux passage area are set such that the induced electromotive force generated in the second electrical path based on the alternating-current signal flowing through the first electrical path or the error in the complex impedance due to the induced electromotive force is within the range.

13. The battery measurement apparatus according to claim 12, wherein:
   a ratio of the resistance value of the resistor and the size of the magnetic flux passage area is set such that the induced electromotive force generated in the second electrical path based on the alternating-current signal flowing through the first electrical path or the error in the complex impedance due to the induced electromotive force is within the range.

14. The battery measurement apparatus according to claim 13, wherein
   the alternating-current signal measuring unit measures the alternating-current signal using a resistor that is provided on the first electrical path; and
   the battery measurement apparatus comprises a correcting unit that corrects the complex impedance calculated by the calculating unit using ωr×MI/Rs, where a frequency of the alternating-current signal is ωr, mutual inductance between the first electrical path and the second electrical path is MI, and a resistance value of the resistor is Rs.

15. The battery measurement apparatus according to claim 1, wherein:
   a fixing member that fixes the first electrical path and the second electrical path is provided.

16. The battery measurement apparatus according to claim 3, wherein:
   a fixing member that fixes the first electrical path and the second electrical path is provided.

* * * * *